United States Patent
Sale et al.

(10) Patent No.: US 6,342,150 B1
(45) Date of Patent: Jan. 29, 2002

(54) REDOX WATER TREATMENT SYSTEM

(76) Inventors: Thomas Clay Sale, 1437 Freedom La., Fort Collins, CO (US) 80526; David Mark Gilbert, 128 Pearl St., Fort Collins, CO (US) 80521

( * ) Notice: Subject to any disclaimer, the term of this patent is extended or adjusted under 35 U.S.C. 154(b) by 0 days.

(21) Appl. No.: 09/392,198

(22) Filed: Sep. 8, 1999

Related U.S. Application Data

(60) Provisional application No. 60/099,607, filed on Sep. 9, 1998.

(51) Int. Cl.$^7$ .............................................. C02F 1/461
(52) U.S. Cl. ...................... 205/688; 205/758; 205/760; 205/761
(58) Field of Search .......................... 204/275; 205/688, 205/758, 760, 761

(56) References Cited

U.S. PATENT DOCUMENTS

| | | | | |
|---|---|---|---|---|
| 3,652,433 A | * | 3/1972 | Thompson | 205/758 |
| 4,436,601 A | * | 3/1984 | Branchick et al. | 205/758 |
| 5,326,439 A | * | 7/1994 | Brewster | 205/761 |
| 5,569,809 A | * | 10/1996 | Gui | 588/204 |
| 5,744,028 A | * | 4/1998 | Goto et al. | 210/181 |
| 5,868,941 A | | 2/1999 | Gillham et al. | |

OTHER PUBLICATIONS

Acar and Alshawabkeh (1993) Environ. Sci. Technology 27:2638–2647. No month available.

Bunce et al. (1998) Development of technology for electrochemical reduction of chlorinated aromatic compounds, in "*Physical, Chemical and Thermal Technologies*," edited by Wickmanayake and Hinchee. Battell Press, Columbus, Ohio, pp. 449–454. No month available.

Gillham and O'Hannesin (1994) Ground Water 32:958–967. No month available.

Langeman (1993) Environ. Sci. Technology 27:2648–2650. No month available.

Lindsay (1979) *Chemical Equilibria in Soils*, John Wiley & Sons, New York, pp. 23–30; 373–383. No month available.

Mantech Environmental Corporation (1998) Statement of Qualifications, unpublished. No month available.

Moore (1972) *Physical Chemistry*, Prentice Hall, New Jersey. pp. 420–423. No month available.

Probstein and Hicks (1993) Science 260:498–503. No month available.

Pitts et al. (Mar. 2–5, 1993) Proceedings of the SPE International Symposium on Oilfield Chemistry. pp. 33–44.

(List continued on next page.)

*Primary Examiner*—Arun S. Phasge
(74) *Attorney, Agent, or Firm*—Swanson & Bratschun, L.L.C.

(57) ABSTRACT

An apparatus for treating a flow of water containing contaminants includes first and second permeable electrodes and a power supply is coupled to each of the first and second permeable electrodes to create an electrical potential therebetween. The first and second permeable electrodes are disposed within the flow of water containing contaminants with the first permeable electrode upstream from the second permeable electrode and the water containing contaminants flowing through and between the permeable electrodes. The permeable electrodes are spaced a select distance to promote an electric current in the water containing contaminants between the electrodes sufficient to sustain oxidation or reduction of the contaminants in the vicinity of the electrodes. The electrodes are preferably substantially planar plates disposed in parallel and substantially normal to the direction of water flow. The distance between the plates is between about 0.001 and 1 meter. The electrodes are preferably made of a conductive material selected from the group including carbon black, vitreous carbon, graphite, stainless steel, aluminum, copper, gold and gold plated stainless steel.

24 Claims, 4 Drawing Sheets

Sale and Applegate (1997) Ground Water 35:418–426. No month available.

Sale et al. (1996) Remediation of DNAPL in Low Permeability Media Project Report. pp. 11–1–11–17. No month available.

Tratnyek et al. (1998) In situ treatment of organic by sequential reduction and oxidation, in "*Physical Chemical and Thermal Technologies*," edited by Wickrmanayake and Hinchee. Battell Press, Columbus, Ohio, pp. 371–376. No month available.

Vogel et al. (1987) Environ. Sci. Technology 21:722–736. No month available.

Wiedemaier et al. (1996) Tecnical Protocol for Evaluating Natural Attenuation of Chlorinated Solvents in Groundwater. Air Force Center for Environmental Excellence. Technology Transfer Division. Brooks Air Force Base, San Antonio, Texas. No month available.

* cited by examiner

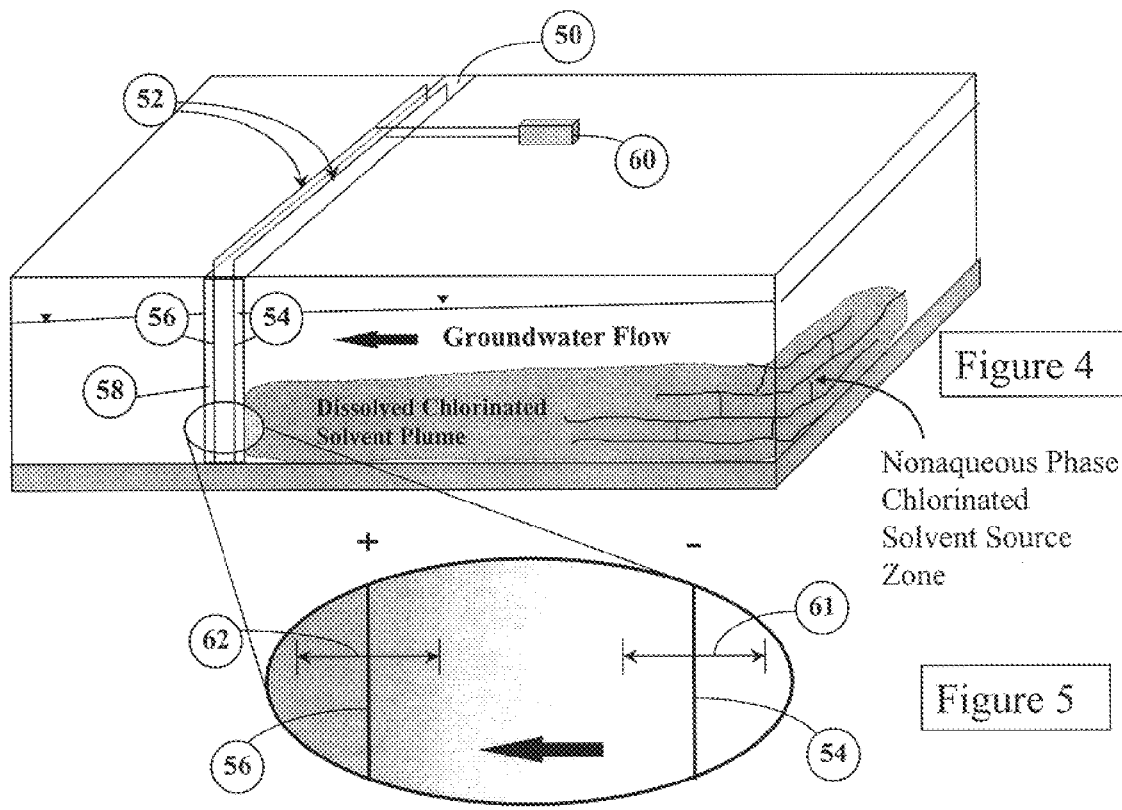

REDOX WATER TREATMENT SYSTEM

RELATED APPLICATIONS

This application claims priority from U.S. Provisional Patent Application Ser. No. 60/099,607, filed Sep. 9, 1998, entitled "Electrically Induced Redox Barriers for Water Treatment."

TECHNICAL FIELD

The present invention is directed toward the treatment of contaminated water, and more particularly toward an electrolytic system promoting oxidation and reduction of ground water contaminants.

BACKGROUND ART

After decades of active research, cost effective mitigation of ground water contamination remains a major technical challenge. In general, most in situ treatment processes have proven both expensive and ineffective. Many of the more promising advances in the last few years have centered on natural or engineered in situ oxidation-reduction (REDOX) reactions. Through these reactions, toxic compounds are transformed in situ to non-toxic products. Examples include biological oxidation of benzene to carbon dioxide and water and abiotic reductive de-halogenation of trichloroethene to chloride and ethylene. Other examples of similar REDOX reactions are described by Weidemeier, Technical Protocol for Evaluating Natural Attenuation of Solvents in Ground Water, Air Force Center for Environmental Excellence, Brooks Air Force Base, San Antonio, Tex., November 1996. While the potential advantages of mitigation of ground water contamination through REDOX reactions has been recognized, effective engineering systems for driving such reactions have proven inadequate. Problems with existing technologies include excessive energy consumption and cost.

Several existing technologies use reduction reactions to degrade contaminants in water. Gillham, U.S. Pat. No. 5,266,213, describes the reductive de-chlorination of chlorinated contaminants in ground water using particulate metal. Gillham, U.S. Pat. No. 5,868,941, describes the use of an electrolytic system for the treatment of halogenated hydrocarbons that passes a plume of contaminated water through a bed of granular iron. An electric circuit is promoted for providing electrons for reducing the contaminant in the vicinity of the granular iron bed. By inducing a voltage in the current in the vicinity of the iron bed, Gillham contends his invention increases the rate at which halogenated hydrocarbons are broken down by reduction and deposition of iron and other precipitants is inhibited. However, known prior art systems fail to provide a suitable anode for promoting oxidation reactions which can be useful both in degrading intermediaries produced in the reductive de-halogenation of certain halogenated hydrocarbons and in degrading other contaminants by oxidation.

The present invention is directed to overcoming one or more of the problems discussed above.

SUMMARY OF THE INVENTION

An apparatus for treating a flow of water containing contaminants includes first and second permeable electrodes. A power supply is coupled to each of the first and second permeable electrodes to create an electrical potential therebetween. The first and second permeable electrodes are disposed within the flow of water containing contaminants with the first permeable electrode upstream from the second permeable electrode and the water containing contaminants flowing through and between the permeable electrodes. The permeable electrodes are spaced a select distance to promote an electric current in the water containing contaminants between the electrodes sufficient to sustain oxidation or reduction of the contaminants in the vicinity of the electrodes. The electrodes are preferably substantially planar plates disposed in parallel and substantially normal to the direction of water flow. The distance between the plates is between about 0.001 and 1 meter. A non-conductive spacer can be placed between the electrodes to maintain the select distance. The electrodes are preferably made of a conductive material selected from the group including carbon black, vitreous carbon, graphite, stainless steel, platinized titanium, mixed metal oxides, aluminum, copper, gold and gold plated stainless steel. The electrodes are preferably in the form selected from the group including perforated plates, screens, wool (e.g., copper wool), felt and weave. When necessary or desired, the invention further contemplates more than one pair of first and second permeable electrodes disposed in series. Each of the first and second permeable electrodes is coupled to the power supply to create an electrical potential therebetween. The power supply may be a DC power supply having a positive terminal coupled to one of the first and second permeable electrodes and a negative terminal coupled to the other of the first and second permeable electrodes. Where multiple pairs of electrodes are provided in series, different voltages can be applied to the electrode pairs as may be necessary or desired to promote a given oxidation or reduction reaction.

Another aspect of the present invention is a method of treating water containing contaminants. The method includes providing a pair of first and second permeable electrodes and flowing the water containing contaminants through and between the electrodes. A voltage is applied between each of the permeable electrodes of the pair sufficient to promote oxidation of the contaminants in the vicinity of one electrode and reduction of the contaminants in the vicinity of the other electrode. The contaminants treated must be subject to degradation through oxidation or reduction, such as halogenated hydrocarbons. The electrodes used in the method are preferably substantially planar plates disposed in parallel substantially normal to the direction of flow of water containing contaminants. The method may further include periodically alternating the polarity of the electrodes to minimize formation of precipitants in the vicinity of the electrodes. More than one pair of first and second permeable electrodes may be provided. If so, a voltage applied to at least one pair of the permeable electrodes may be different from the voltage applied to another pair of permeable electrodes.

The invention uses electrolytic technology to either oxidize or reduce a ground water contaminant to a non-hazardous product(s). Treatable contaminants are those subject to REDOX degradation, such as halogenated hydrocarbons, fuel hydrocarbons, nitrates, ammonium perchlorate or MTBE. Illustrative is the reductive de-halogenation of perchloroethene (PCE). At the cathode, PCE is reduced to methane gas through the following reactions:

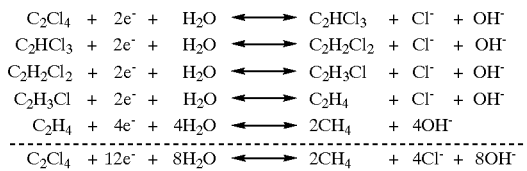

At the anode the products will be oxidized through the following steps:

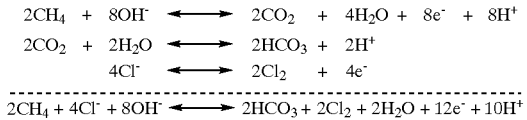

The net reaction for the entire system is then:

$$C_2Cl_4 + 6H_2O \longleftrightarrow 2HCO_3 + 2Cl_2 + 10\ H^+$$

Thus, through sequential reduction and oxidation, PCE is degraded to non-hazardous products.

By varying the placement of the cathode and anode, the use of multiple cathodes and anodes, applying various voltages and varying electrode material the present invention can be used to degrade any REDOX sensitive constituent present in ground water through either sequential oxidation and reduction, sequential reduction and oxidation or multiple combinations of oxidation and reduction. The permeable electrodes maximize surface area to fully promote the oxidative/reductive capacity of the system. The apparatus is modifiable and controllable through manipulation of applied voltage potential and electrode spacing to meet specific field conditions (e.g., flow rates and water quality objectives). Voltage applied across the electrode can be periodically reversed to avoid adverse precipitation of solid phase constituents, a common constraint of existing in situ treatment systems. Selection of electrode material can be specific to the contaminant to be treated as well as economic and logistical concerns. Representative electrode materials can include graphite (as a pure or fractional component) aluminum, copper, stainless steel, gold or other conductive or semiconductive materials. The chemical thermodynamic conditions of the intraelectrode treatment zone can also be controlled through variation in voltage potential between electrode plates to optimize treatment of specific contaminants.

The system relies upon the natural flow of the ground water to move contaminants through the system and to encourage electron transfer. Most prior art systems encourage contaminant mitigation by electro-osmosis or electro kinetics and therefore require large electrode spacings and significant voltage drops to generate electromotive force that draw water, contaminants and/or flushing solutions through a targeted zone. However, the costs associated with large power requirements necessary to drive these systems have limited their application to narrow niches. As a result of the low energy consumption of the present invention, it presents a highly effective, simple and low cost treatment alternative. The voltages need only be sufficient to overcome reaction activation energies and provide the thermodynamic conditions necessary to make the desired oxidation or reduction favorable. Amperages need only be sufficient to address the stoichiometry of the oxidation and reduction reactions occurring at the electrodes. With the low energy requirements of this technology, power could be supplied by any number of low voltage sources, including passive solar panels. The simplicity of the apparatus, its low construction cost, its low operating costs and its versatility all support its widespread application.

BRIEF DESCRIPTION OF THE DRAWINGS

FIG. 4 is a schematic representation of an in situ application of the apparatus for promoting oxidation and reduction of water contaminants;

FIG. 5 illustrates the electrically induced oxidation and reduction zones in the vicinity of the electrodes of FIG. 3.

DETAILED DESCRIPTION OF THE PREFERRED EMBODIMENT

Figure 1:
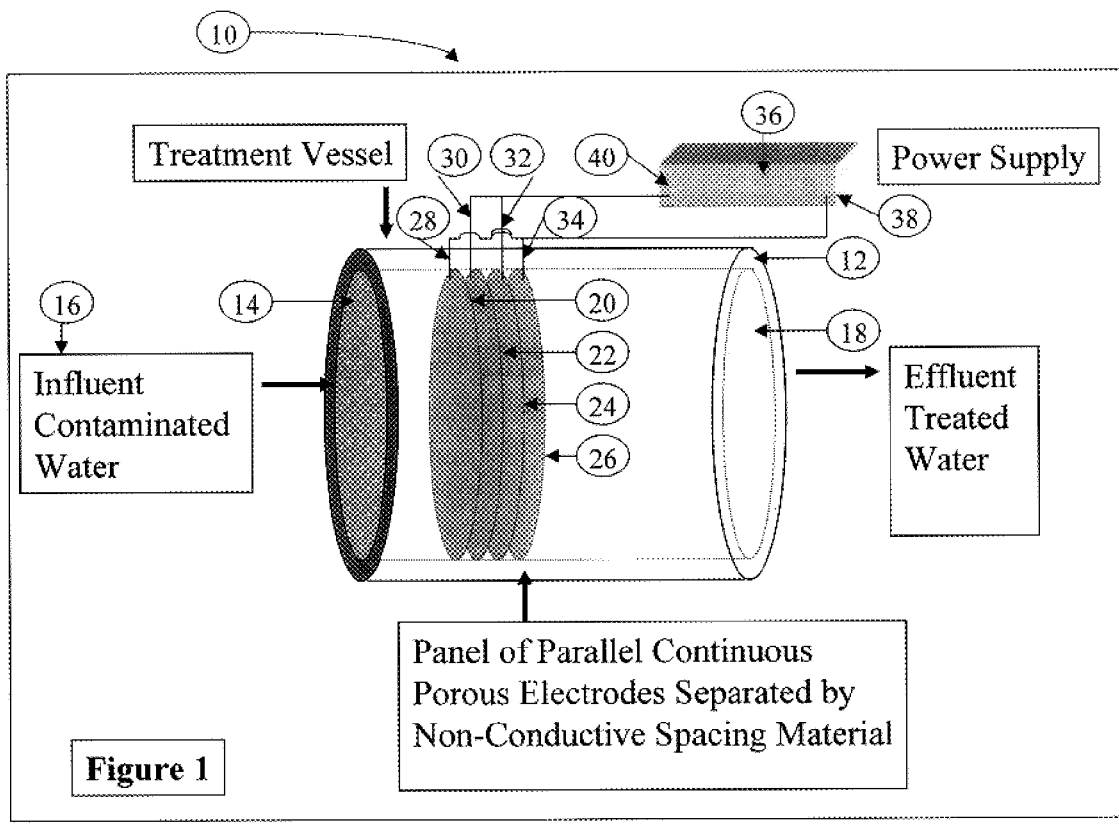
FIG. 1 is a schematic representation of an apparatus for promoting oxidation and reduction of water contaminant in accordance with the present invention.

An apparatus for promoting oxidation and reduction of water REDOX susceptible contaminants 10 is illustrated schematically in FIG. 1. This apparatus would be suitable for laboratory or industrial application of the present invention. The apparatus 10 consists of a containment vessel 12 having an inlet 14 in fluid communication with a source of water containing contaminants 16 and an outlet 18. Within the containment vessel 12 a number of planar porous electrodes 20, 22, 24 and 26 are disposed in parallel normal to the direction of flow of water containing contaminants through the containment vessel 12. Each of the planar porous electrodes is electrically coupled by connectors 28, 30, 32 and 34 to a power supply 36. While the power supply 36 may be an alternating current supply, the power supply 36 is preferably a DC power supply having its negative terminal 38 coupled to electrodes 20 and 26 through connectors 28, 34 and its positive terminal 40 coupled to the electrodes 22, 24 via connectors 30, 32.

Figure 2:
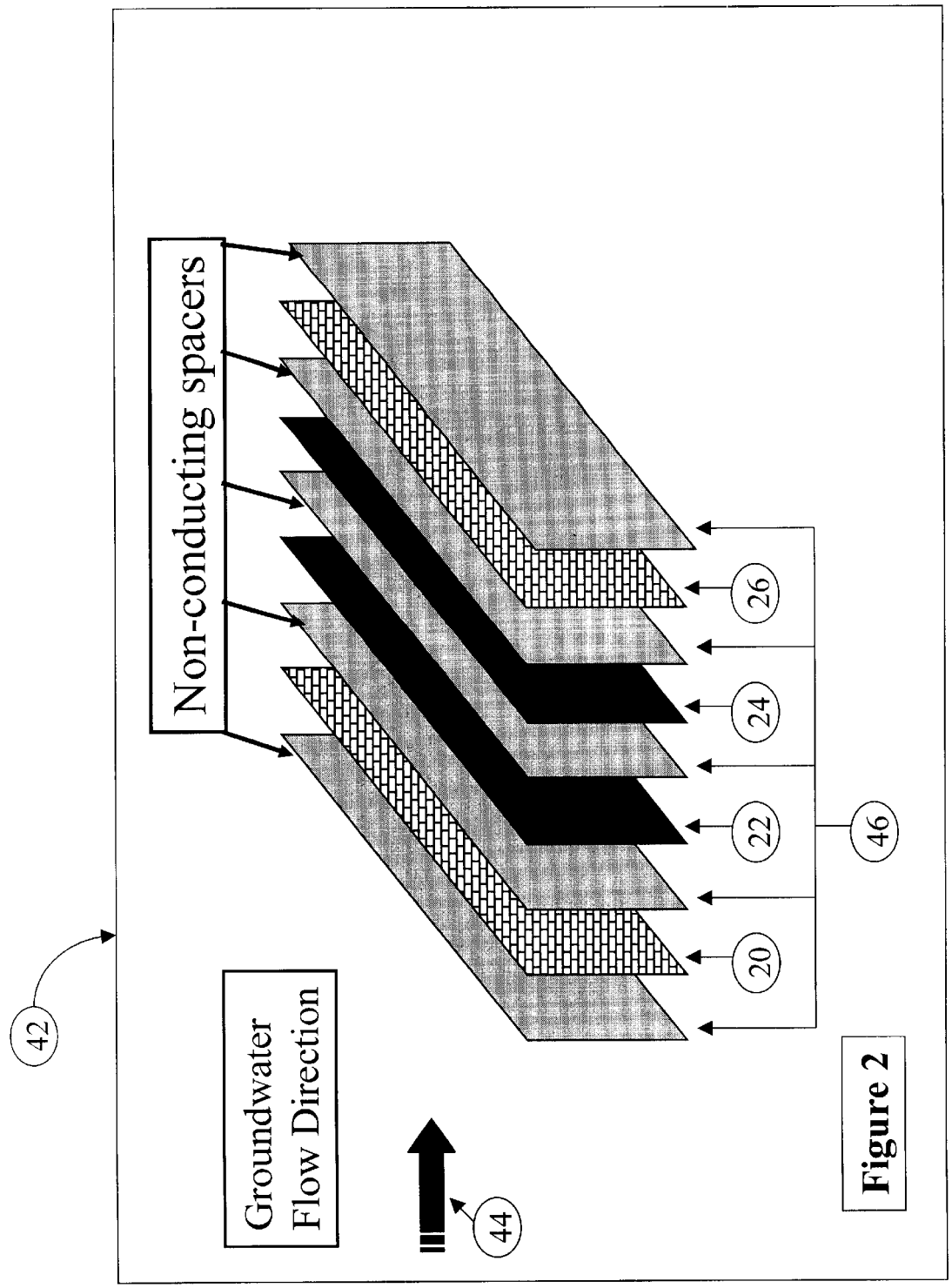
FIG. 2 is a schematic representation the electrodes used in the apparatus of FIG. 1.

The planar porous electrodes are preferably part of an assembly 42 shown schematically in FIG. 2. The direction of water containing contaminant flow is illustrated by the arrow 44. Each of the planar porous electrodes 20, 22, 24 and 26 are separated by non-conducting spacers 46. The non-conducting spacers 46, which could be made of, for example, a thermal plastic or glass, maintain the planar porous electrodes spaced a select distance. In the assembly 42, electrodes consist of two electrode pairs each consisting of a negative electrode and a positive electrode. The first electrode pair consists of the negative electrode 20 and the positive electrode 22 and the second electrode pair consists of the positive electrode 24 and the negative electrode 26. The planar porous electrodes can be varied to be arranged negative-positive-positive-negative as shown in FIG. 2, negative-positive-negative-positive or in any other combination.

The electrodes may be made of any number of conductive or semiconductive materials. Representative materials include vitreous carbon, carbon black, graphite felt, stainless steel, copper, gold plated stainless steel, copper wool, platinized titanium, mixed metal oxides, graphite or aluminum. The selected electrode material is preferably stable in the applied environment. The electrodes also are preferably configured to have a large surface area so as to promote oxidation and reduction. Thus, the electrodes can be in the form of a wool (e.g., copper wool) a screen, a fabric, perforated plates, sintered metal, felts or the like.

In use, water containing contaminants is flowed into the inlet 14 and through and between the planar porous electrodes 20, 22, 24 and 26 and out the outlet 18 as a treated effluent. The negative electrodes 20 and 26 act as electron donors to promote reduction of contaminants in their vicinity. Positive electrodes 22 and 24 act as electron receptors to promote oxidation in their vicinity. The invention contemplates the use of a single pair of electrodes 20, 22 or multiple pairs of electrodes as illustrated in FIG. 2. The exact configuration is a matter of design choice and based upon a number of factors including the contaminant to be treated, the concentration of the contaminant, the flow rate of the water containing contaminants, the temperature of the water and many other factors known in the art. Another important factor is the spacing of the planar porous electrodes. The spacing may vary between about 0.001–1 meters, depending upon the various factors set forth above. However, at least in laboratory applications, closer spacing has proven advantageous. Closer spacing decreases the voltage required to generate the necessary current and thereby increases the efficiency of the system. The potential between plate pairs can be the same or varied, depending upon treatment requirements. Thus, if desired, a separate power supply can be associated with each pair of planar porous electrodes.

The system requires a relatively low potential of between 10 and 40 volts between electrodes of an electrode pair, depending upon a variety of factors such as the particular contaminant, flow rate, temperature, electrode material, electrode spacing and the like. In addition, extremely low currents are required to facilitate desired oxidation and reduction reactions. For example, based on the PCE mass flux through the apparatus and Faraday's Law, the ideal amperage or faradaic current for the treatment of PCE can be calculated as follows:

$$I_{PCE} = \frac{V_w \phi A C_{PCE}}{MW_{PCE}} z \frac{96487 \text{ C}}{\text{mole}}$$

where:

I=amperage $V_W$=seepage velocity f=porosity

Figure 3:
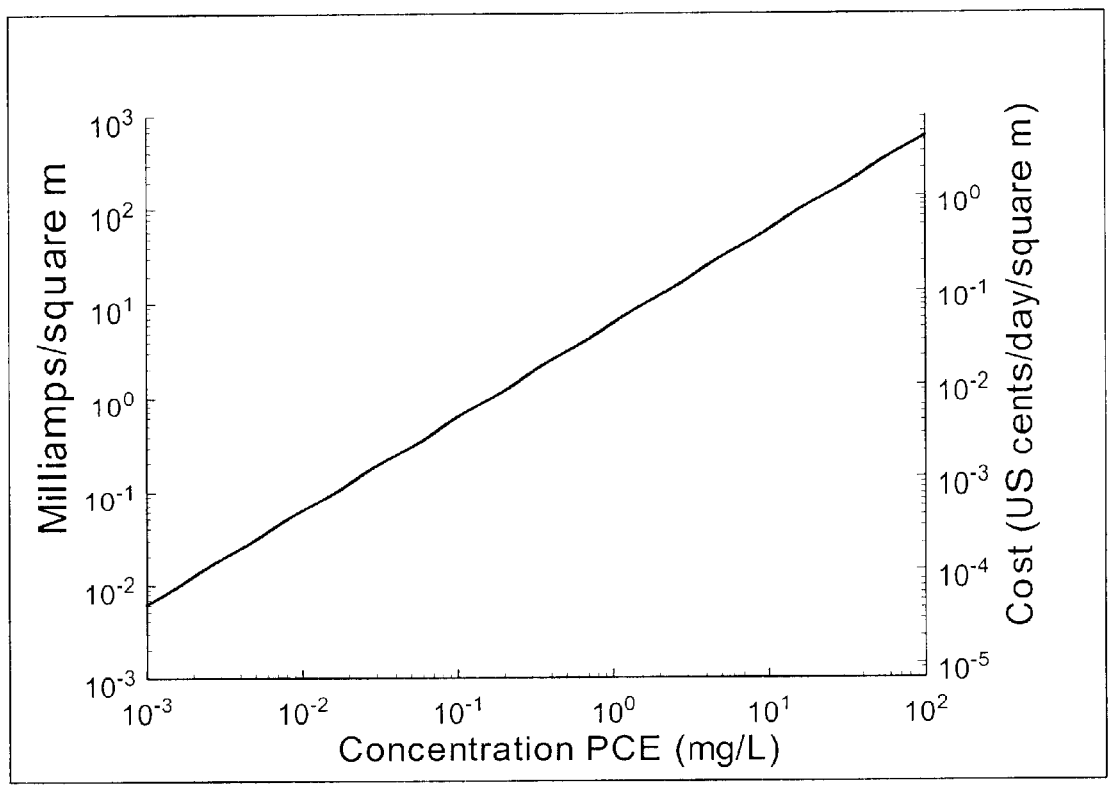
FIG. 3 is a graph of ideal or theoretical amperage required to promote reduction of PCE.

A=cross sectional area of electrodes $C_{PCE}$=concentration of PCE in aqueous phase $MW_{PCE}$=molecular weight of PCE z=electron equivalents C=coulombs This equation describes the governing principles for a flow through electrolytic cell. FIG. 3 is an application of this equation that describes ideal amperage and cost associated with the apparatus for promoting oxidation and reduction of water contaminants. FIG. 3 illustrates that amperages can be adjusted for varying concentrations and that the cost of electricity for the system, assuming the cost of 10¢/kilowatt hour, one foot per day seepage velocity, and porosity of 0.3, is very low.

An in situ application of the apparatus for promoting oxidation and reduction is illustrated in FIG. 4. In this embodiment a trench 50 is excavated normal to the path of ground water flow. An assembly of planar porous electrodes 52 is inserted in the trench, again, normal to the direction of ground water flow. As discussed above, the assembly may consist of a single pair of electrodes, or multiple pairs of electrodes, depending upon the treatment requirements. For ease of illustration, the assembly illustrated in FIG. 4 consists of a negative electrode 54 and a positive electrode 56. Although not shown in FIG. 4, a suitable non-conductive spacer, as discussed above, is preferably disposed between the electrodes 54 and 56 to maintain them a select distance apart. Once installed in the trench, the trench is back filled with a suitable porous granular material 58, such as gravel. A variable voltage DC power supply 60 is coupled to the electrodes 54, 56. Because of the lower power requirements of the system, the power supply 60 could come from any number of passive sources including solar or wind electrical generators. As the ground water flows through and between the porous planar electrodes 54, 56, reduction zone 61 is promoted in the vicinity of the negative electrode 54 and an oxidation zone 62 is generated in the vicinity of the positive electrode 56 as illustrated in FIG. 5.

EXAMPLE 1

Electrically induced degradation of PCE to non-hazardous byproducts through reduction and oxidation has been accomplished under laboratory conditions. A removal rate of approximately 85% was achieved under the following conditions using a single pair of electrodes:

| | |
|---|---|
| Negative electrode | 2 cm thick copper wool |
| Positive electrode | stainless steel screen with gold plate |
| Electrode spacing | approximately 5 cm |
| Applied voltage | 40 volts |
| Flow rate | approximately 1 foot per day |
| Influent PCE concentration | 110 mg/liter; |
| Resultant amperage | approximately 30 mA |

EXAMPLE 2

Experiments using multiple, sequence electrodes have yielded higher PCE removal rates. A PCE removal rate of 95% was obtained under the following operating conditions using two pairs of electrodes:

| | |
|---|---|
| Upstream electrodes | identical perforated high-density polyethylene impregnated with carbon black (approx. 1 mm thick) |
| Down stream electrode pair | |
| Negative electrode | perforated high-density polyethylene impregnated with carbon black (approx. 1 mm thick) |
| Positive electrode | stainless steel screen with gold plate configuration of electrodes |
| Electrode configuration | the upstream electrode pair was configured with the positive electrode leading the negative electrode and the down stream electrode pair was configured with the negative electrode leading the positive electrode |
| Electrode spacing | approximately 2 cm for all electrodes |
| Applied voltage | 40 volts for each electrode pair |
| Flow rate | approximately 1 foot per day |
| Influent PCE concentration | 110 mg/liter |
| Resultant amperage | Upstream pair: 40 mA<br>Downstream pair: 10 mA |

What is claimed is:

1. An apparatus for treating an in situ flow of ground water containing contaminants, the apparatus comprising:

first and second permeable metal electrodes, wherein one of said first and second permeable electrodes is a positive electrode and the other is a negative electrode; and a power supply coupled to each of the first and second permeable electrodes to create an electrical potential therebetween, the first and second permeable electrodes being disposed in situ within the flow of ground water containing contaminants with the first permeable electrode upstream from the second permeable electrode and the water containing contaminants flowing through and between the permeable electrodes, the permeable electrodes being spaced a select distance to promote an electric current in the water containing contaminants between the electrodes sufficient to sustain oxidation or reduction of The contaminants in the vicinity of the electrodes, whereby oxidation of the contaminates occurs in the vicinity of the positive electrode and reduction of the contaminants occurs in the vicinity of the negative electrode; wherein said flow of water is equal to a rate of flow of the groundwater.

2. The apparatus of claim 1 wherein the electrodes comprise substantially planar plates disposed in parallel and substantially normal to the direction of flow.

3. The apparatus of claim 2 further comprising a non-conductive spacer between the electrodes to maintain the select distance.

4. The apparatus of claim 1 wherein the select distance is between about 0.001 and 1 meter.

5. The apparatus of claim 1 wherein the electrodes are made of a conductive material selected from the group consisting of stainless steel, aluminum, copper, platinized titanium, mixed metal oxides, gold and gold plated stainless steel.

6. The apparatus of claim 5 wherein the electrodes are in a form selected from the group consisting of perforated plates, screens, wool, felt and weave.

7. The apparatus of claim 1 comprising more than one pair of first and second permeable electrodes disposed in series, with each of first and second permeable electrodes coupled to the power supply to create an electrode potential therebetween.

8. The apparatus of claim 1 wherein the power supply is a DC power supply having a positive terminal coupled to one of the first and second electrodes and a negative terminal coupled to the other of the first and second electrodes.

9. The apparatus of claim 1 comprising more than one pair of first and second permeable electrodes disposed in series in the flow of ground water containing contaminants and means for providing a potential between at least one of the permeable electrode pairs that differs from a potential between another of the permeable electrode pairs.

10. The method of claim 1 wherein the electrical potential between said first and second permeable electrodes is between 10–40 volts.

11. An apparatus for treating an in situ flow of ground water containing contaminants, the apparatus comprising:

first and second permeable, planar metal electrodes; and a DC power supply having a positive terminal coupled to one of the first and second electrodes and a negative terminal coupled to the other of the first and second electrodes to create a select potential therebetween;

the fist and second electrodes being disposed in situ in the flow of ground water containing contaminants with the fist electrode upstream from the second electrode and the water containing contaminants flowing through and between the electrodes, the electrodes being spaced a select distance whereby oxidation of the contaminates occurs in the vicinity of the positive electrode and reduction of the contaminants occurs in the vicinity of the negative electrode; wherein said flow of water is equal to a rate of flow of groundwater.

12. The apparatus of claim 11 wherein the select distance is between about 0.001 and 1 meter.

13. The apparatus of claim 12 further comprising a non-conductive spacer between the electrodes to maintain the select distance.

14. The apparatus of claim 11 wherein the electrodes are made of a conductive material selected from the group consisting of stainless steel, aluminum, copper, platinized titanium, mixed metal oxides, gold and gold plated stainless steel.

15. The apparatus of claim 14 wherein the electrodes are in a form selected from the group consisting of perforated plates, screens, wool, felt and weave.

16. The method of claim 14 wherein the electrical potential between said first and second permeable electrodes is between 10–40 volts.

17. The apparatus of claim 11 wherein the power supply is a DC power supply having a positive terminal coupled to one of the first and second electrodes and a negative terminal coupled to the other of the first and second electrodes.

18. A method of treating in situ ground water containing contaminants comprising:

providing in situ a pair of first and second permeable metal electrodes;

flowing the ground water containing contaminants through and between the electrodes at a flow rate equal to a flow of the groundwater; and applying a voltage between each permeable electrode of the pair sufficient to promote oxidation of the contaminants in the vicinity of one electrode and reduction of the contaminants in the vicinity of the other electrode.

19. The method of claim 18 wherein the contaminant is a halogenated hydrocarbon.

20. The method of claim 19 further comprising periodically alternating the polarity of the electrodes.

21. The method of claim 18 further comprising the electrodes being substantially planar plates disposed in parallel and substantially normal to the direction of flow of the ground water containing contaminants.

22. The method of claim 18 further comprising providing more than one pair of first and second permeable electrodes.

23. The method of claim 22 further comprising applying a voltage to at least one pair of permeable electrodes that is different from a voltage applied to another pair of permeable electrodes.

24. The method of claim 18 wherein the voltage applied between said first and second permeable electrodes is between 10–40 volts.

* * * * *